(No Model.)
G. FIERHELLER.
HARNESS.
No. 553,114. Patented Jan. 14, 1896.
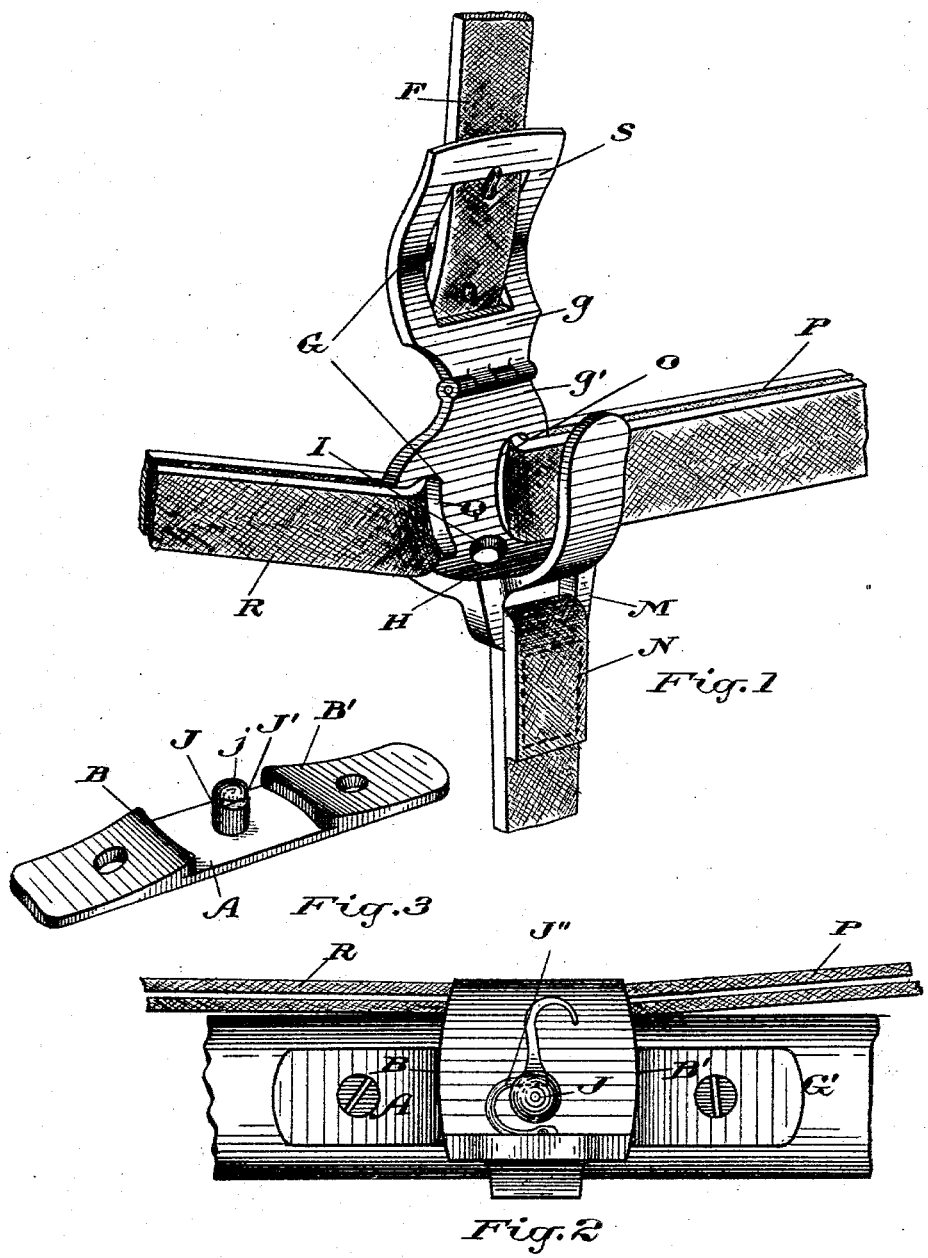
Witnesses
J. E. Cameron
Donald A. Ridout
Inventor
George Fierheller
by C. H. Riches
his Attorney though the use of the shaft-tugs.

UNITED STATES PATENT OFFICE.

GEORGE FIERHELLER, OF MARKHAM, CANADA.

HARNESS.

SPECIFICATION forming part of Letters Patent No. 553,114, dated January 14, 1896.

Application filed August 9, 1895. Serial No. 558,727. (No model.)

*To all whom it may concern:*

Be it known that I, GEORGE FIERHELLER, of Markham, in the county of York and Province of Ontario, Canada, have invented certain new and useful Improvements in Harness; and I hereby declare that the following is a full, clear, and exact description of the same.

This invention relates to certain new and useful improvements in shaft-tugs, and the object of the invention is to produce a simple and effective contrivance by means of which the use of traces and breeching-straps may be entirely dispensed with and which will support the outer end of the shafts or thills, and to so arrange the device that by means of it a horse may be readily hitched to a vehicle or as readily unhitched from the same; and the invention consists essentially of the device hereinafter more fully set forth, and more particularly pointed out in the claim.

In the drawings, Figure 1 is a perspective view of the shaft-tug. Fig. 2 is a plan view of the shaft-tug from the under side. Fig. 3 is a perspective view from the under side of the shaft-plate and pin.

Like letters of reference refer to like parts throughout the specification and drawings.

The shaft-tug G is made in two sections $g$ $g'$ suitably hinged together. In the upper section $g$ is formed a buckle S to receive and hold the back-strap F. The lower section $g'$ is substantially hook-shaped, to provide a support H for the shaft G'. This hook-shaped support H corresponds in its lines exactly in size and shape with the shaft G' in order that the shaft G' will fit tightly into the hook-shaped support H and be permitted no side motion whatever. Formed through the middle portion of the hook-shaped support H is an opening I, through which passes a pin J, and which projects slightly beyond the under side of the said hook-shaped support H. A groove J' is formed in that portion of the pin J which projects beyond the shaft-tug G, and this groove J' is so located as to be contiguous to the under side of the shaft-tug when the shaft is being supported by the said shaft-tug. Pivoted to the under side of the hook-shaped support H is a spring-operated latch J", which is adapted to enter the groove J' and assist in retaining the pin J in position in the opening I. The pin J is provided with a rounded head $j$ to displace the spring-operated latch J" during the entry of the pin J into the opening I. The spring-operated latch J" is so arranged as to spring into the groove J' immediately it has cleared the under side of the hook-shaped support H in order that the pin J cannot be displaced by any motion of the shafts. The opening I is of substantially the same size and shape as the pin J in order that the pin J can fit snugly into the hook-shaped support and be prevented from having any side motion whatever. The pin J is connected to or formed integrally with a shaft-plate A, which is adapted to be screwed, bolted, or otherwise fastened to the shaft G'. Connected to or formed integrally with the plate A are two projections B B', respectively, located one on either side of the shaft-pin J. The lugs or projections B B' are so arranged as to fit snugly against the sides of the hook-shaped support H, and the object of the lugs or projections B B' is to prevent any possibility of the longitudinal displacement of the shaft while held by the hook-shaped support H, and to assist the shaft-tug in its draft on the shaft when drawing or backing the vehicle, the sides of the hook-shaped support preventing the lateral displacement, and the spring-operated latch preventing the vertical displacement of the said shaft. The under side of the hook-shaped support H is provided with a loop M, to which is attached the girth-strap N, while one side of the hook-shaped support H is provided with a loop O, to which is connected the breeching-strap P, while the other side of the hook-shaped support H is provided with a loop Q, to which is attached the hame-tug strap R. By the use of my shaft-tug the trace-tugs have been entirely dispensed with, and the breeching-straps are attached to the shaft-tug in place of being wound around and attached to the shaft.

The operation of the device is as follows: In hitching a horse the shafts are placed in the shaft-tugs, and the pin J is passed through the opening I in the hook-shaped support H, and is locked therein by the spring-operated latch J" entering the groove J' in the said pin, the unhitching of the horse being the reverse of that of the hitching motions just described—that is to say, the spring-operated latch is withdrawn from the groove in the pin J and the pin is lifted out of the opening I.

The object of hinging together the two sections $g$ $g'$ is to allow of the motion of the shafts and support H without interfering with the position of or causing motion to the section $g$.

Having thus fully described my invention, what I claim as new, and desire to secure by Letters Patent, is—

A shaft tug comprised of a hook shaped support to receive and fit the shaft, an opening through the bottom of the hook shaped support, a buckle connected to the hook shaped support to receive and hold the back strap, a loop on either side of the hook shaped support, and a loop on the under side of the hook shaped support to receive respectively the hame-tug straps, the breeching straps, and the girth straps, and a spring operated latch connected to the under side of the hook shaped support in combination with the shaft, a plate connected to the under side of the shaft, a pin depending upon the plate, adapted to enter the opening in the hook shaped support, a groove in the pin adapted to receive the spring operated latch, a lug or projection depending from the plate adapted to bear tightly against the sides of the hook shaped support to prevent the longitudinal displacement of the shaft, substantially as specified.

Toronto, July 31, A. D. 1895.

GEO. FIERHELLER.

In presence of—
C. H. RICHES,
DONALD C. RIDOUT.